Dec. 29, 1970   K. FREY   3,550,253
PROCESS FOR MANUFACTURING PIPE BENDS FROM CAST METALLIC
MATERIAL AND A PIPE BEND
Filed Jan. 18, 1968
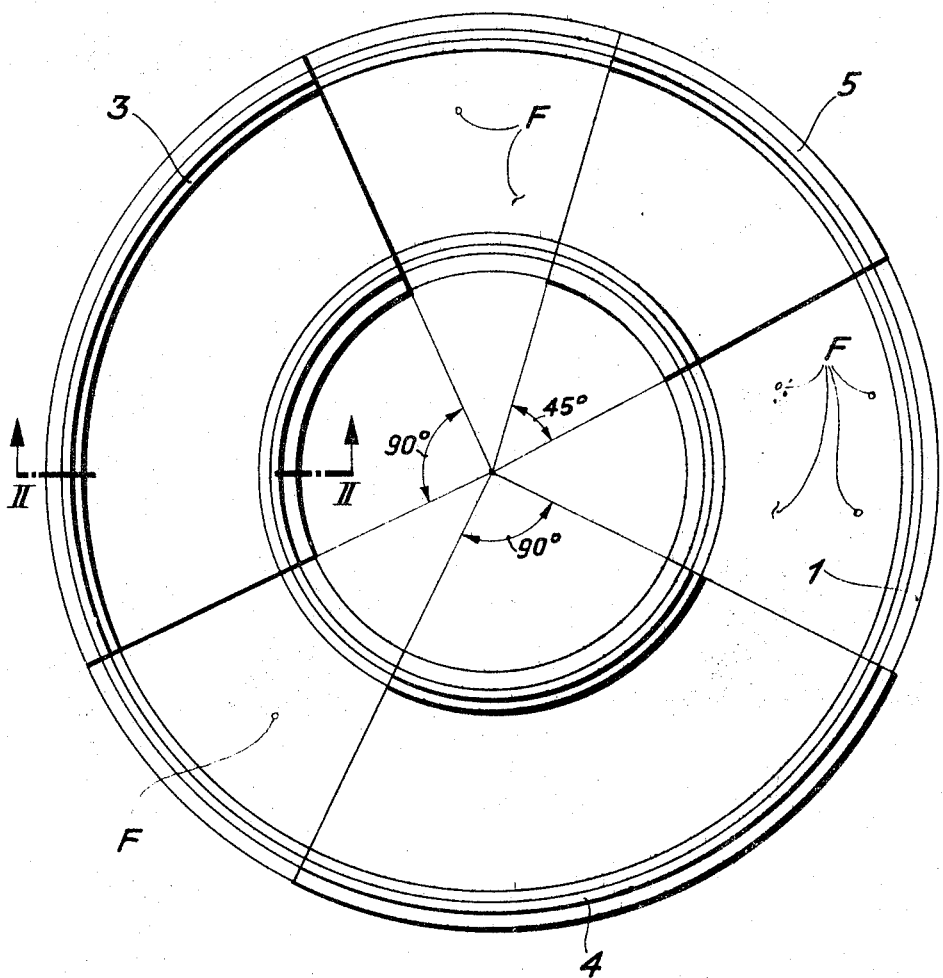
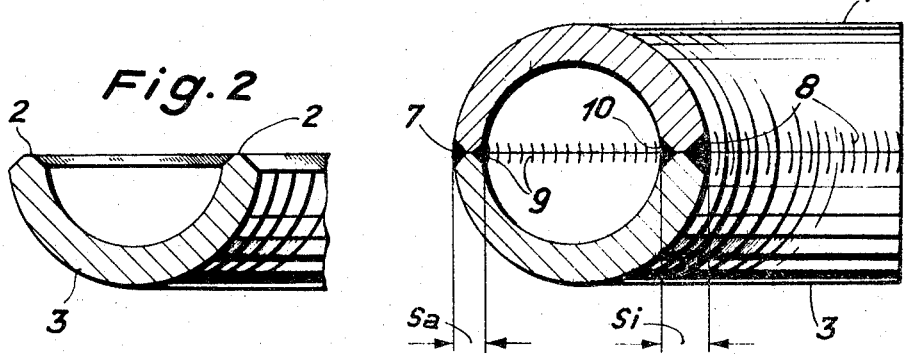
Inventor:
KARL FREY
BY
Kenyon & Kenyon
ATTORNEYS

United States Patent Office 3,550,253
Patented Dec. 29, 1970

3,550,253
PROCESS FOR MANUFACTURING PIPE BENDS FROM CAST METALLIC MATERIAL AND A PIPE BEND
Karl Frey, Rumikon-Raterschen, Zurich, Switzerland, assignor to Sulzer Brothers, Ltd., Winterthur, Switzerland, a corporation of Switzerland
Filed Jan. 18, 1968, Ser. No. 698,751
Claims priority, application Switzerland, Jan. 23, 1967, 955/67
Int. Cl. B23k 31/02
U.S. Cl. 29—471.1
2 Claims

ABSTRACT OF THE DISCLOSURE

A semi-toroidal dish of casting material is cast and, after non-destructive testing, sectors of unflawed material are cut out. Sectors of equal angle are then placed on each other and welded together to form a pipe bend. The plane of bisection of the dish is at a right angle to the rotational axis of the torus.

---

This invention relates to a process for manufacturing pipe bends from cast metallic material. More particularly, this invention relates to a pipe bend of cast metallic material and a process for making the same. Still more particularly, this invention relates to a pipe bend of cast metallic material for nuclear reactors and a process of making the same.

Previously, the pipe bends which have been used in nuclear reactor installations have been cast from steel in one piece. However, this process has considerable disadvantages since it includes the use of cores which are difficult to mount in the molds used to cast the pipe bends. Also, the processing and non-destructive testing of the material involve difficulties particularly if the pipe bends have relatively small internal diameters.

Accordingly, it is an object of the invention to use simple casting molds in manufacturing pipe bends from cast metallic material.

It is another object of the invention to provide a process of making cast pipe bends which permits easy workability and high accessibility for non-destructive material testing.

Briefly, the invention utilizes simple casting molds without cores in manufacturing pipe bends. The method of the invention includes the step of initially casting semi-toroidal dishes, the plane of bisection of which is at right angles to the rotational axis of the torus. These dishes are then machined on all sides and thereafter subjected to non-destructive material testing. Sectors of the dishes having the desired bend angle are then cut out of those dish portions which are found to be unflawed and pairs of sectors having the same bend angle are welded together along longitudinal seams to form pipe bends.

As the semi-toroidal dishes can be readily and accurately machined inside and out by turning, the cost of material and the weight are relatively low. Also, the toroidal dishes are readily accessible for non-destructive material testing, for example, by means of X-rays or ultrasonic testing. Further, by casting annular dishes, any flaws in the toroidal dishes, for example, blowholes, cracks and the like, can be separated from the unflawed portions without much loss. Also, because of the simple workability and precise machinability, the process of the invention permits the external wall of the bend to be made thinner than the internal wall so as to impart equal stressing over the periphery of the bend.

These and other objects and advantages of the invention will become more apparent from the following detailed description and appended claims taken in conjunction with the accompanying drawings in which:

FIG. 1 illustrates a plan view of a semi-toroidal dish utilized by the invention;

FIG. 2 illustrates a view on line II—II of FIG. 1; and

FIG. 3 illustrates a cross-section view through a pipe bend made in accordance with the invention.

Referring to FIGS. 1 and 2, the process of making pipe bends initially casts a semi-toroidal dish 1 which consists, for example, of corrosion-resistant chrome-nickel steel. The dish 1 is machined inside and out by turning and the edges 2 which are to be welded at a later time as explained below are prepared at the same time. The dish 1 is then subjected to non-destructive testing to reveal flaws F, for example, blowholes, shrink holes and cracks. After testing, sectors 3, 4, 5 are cut out of the toroidal dish 1 between the areas containing the flaws F. These sectors 3, 4, 5 are unflawed and form halves of bends. As shown, the sectors 3, 4 have a bend angle of 90° and sector 5 has a bend angle of 45°.

Referring to FIG. 3, the pair of unflawed sectors 3, 4 are placed on top of one another and joined by longitudinal welds 7, 8, 9, 10 to produce a 90° pipe bend. Additionally, the outside wall thickness $Sa$ of the pipe bend is made smaller than the inside wall thickness $Si$ in order to compensate for the stresses on the inside and outside of the bend. This difference in wall thickness can be obtained solely by machining or during production of the casting mold possibly in combination with machining.

The sector 5 is welded to another corresponding sector from another dish in a similar manner to produce a 45° bend.

In the embodiment shown, the plane bisecting the torus at a right angle to the rotational axis of the torus passes through the center of the internal circular section of the bend. Alternatively, this plane can pass slightly above or below this center. Further, instead of using four welds to secure two corresponding bend halves together, two welds can be used, that is, a single V weld can be used for the inside wall of the bend and a second V weld can be used for the outside wall of the bend.

Having thus described the invention it is not intended that it be so limited as changes may be readily made therein without departing from the scope of the invention. Accordingly, it is intended that the foregoing abstract of the disclosure and the subject matter described above and shown in the drawings be interpreted as illustrative and not in a limiting sense.

What is claimed is:

1. A process for manufacturing pipe bends from cast metallic material comprising the steps of
   casting a semi-toroidal dish having a plane of bisection at a right angle to the rotational axis of the torus,
   machining the cast dish on all sides,
   subjecting the machined dish to non-destructive material testing for detection of flaws therein,
   cutting out unflawed sectors from the dish of predetermined bend angle, and welding a pair of unflawed sectors having the same bend angle together along longitudinal seams to form a pipe bend.

2. A process as set forth in claim 1 wherein said casting step includes the formation of an outside wall of smaller thickness than the inside wall in the semi-toroidal dish.

References Cited

UNITED STATES PATENTS

| | | | |
|---|---|---|---|
| 45,083 | 11/1864 | Savoral | 29—463 |
| 165,302 | 7/1875 | Butler | 29—463 |
| 2,192,471 | 3/1940 | Harbison | 29—463 |
| 2,335,887 | 12/1943 | Smith | 29—463 |

JOHN F. CAMPBELL, Primary Examiner

R. B. LAZARUS, Assistant Examiner

U.S. Cl. X.R.

29—407, 463, 475; 164—4